United States Patent
Liu et al.

(10) Patent No.: US 10,769,226 B2
(45) Date of Patent: Sep. 8, 2020

(54) DYNAMICALLY SELECTING A SCOPE OF FRIENDS FOR SHARING ON SOCIAL MEDIA BASED ON SHARING CRITERIA AND INTEREST

(71) Applicant: International Business Machines Corporation, Armonk, NY (US)

(72) Inventors: Su Liu, Austin, TX (US); Cheng Xu, Beijing (CN); Jun Su, Beijing (CN); Debbie Anglin, Williamson, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 16/134,493

(22) Filed: Sep. 18, 2018

(65) Prior Publication Data

US 2020/0089811 A1 Mar. 19, 2020

(51) Int. Cl.
| | |
|---|---|
| *G06F 3/048* | (2013.01) |
| *G06F 16/9535* | (2019.01) |
| *G06F 3/0482* | (2013.01) |
| *G06F 3/0484* | (2013.01) |
| *H04L 12/58* | (2006.01) |
| *G06F 16/435* | (2019.01) |

(52) U.S. Cl.
CPC ........ *G06F 16/9535* (2019.01); *G06F 3/0482* (2013.01); *G06F 3/04847* (2013.01); *G06F 16/435* (2019.01); *H04L 51/32* (2013.01)

(58) Field of Classification Search
CPC ........ G06Q 50/01; G06Q 30/00; G06F 3/048; G06F 3/00; G06F 17/30; G06F 16/00
See application file for complete search history.

(56) References Cited

U.S. PATENT DOCUMENTS

| | | | |
|---|---|---|---|
| 8,224,353 B2 * | 7/2012 | Wright | H04L 67/18 455/456.3 |
| 8,701,025 B2 | 4/2014 | Bakalov et al. | |
| 8,832,567 B1 * | 9/2014 | Jing | G06F 3/0486 715/738 |
| 9,430,561 B2 | 8/2016 | Powell | |
| 2011/0258569 A1 * | 10/2011 | Weir | G06F 3/048 715/771 |
| 2013/0159110 A1 * | 6/2013 | Rajaram | G06Q 30/02 705/14.66 |
| 2014/0046955 A1 | 2/2014 | Dollard | |
| 2014/0108973 A1 * | 4/2014 | Stark | G06F 3/0484 715/762 |
| 2016/0021179 A1 | 1/2016 | James et al. | |
| 2016/0205105 A1 * | 7/2016 | Nainwal | H04L 63/101 726/28 |

(Continued)

*Primary Examiner* — Hugo Molina
(74) *Attorney, Agent, or Firm* — Martin & Associates, LLC; Derek P. Martin

(57) ABSTRACT

A graphical user interface allows a user to dynamically select a scope of friends to share media content based on a sharing criteria and interest degree analysis. The sharing criteria may be selected by the user to filter friends for sharing content. The interest degree analysis may be provided from a social media platform that identifies the topic and content of the media which is being shared and determines a degree of interest for each friend on the identified topic. The degree of interest is used to assign each friend to a sharing scope on the graphical user interface to allow the user to select a scope of friends to share the media.

13 Claims, 6 Drawing Sheets

FIG. 4D

(56) References Cited

U.S. PATENT DOCUMENTS

| | | | |
|---|---|---|---|
| 2016/0205207 A1* | 7/2016 | Backstrom | H04L 67/22 |
| | | | 709/224 |
| 2018/0124159 A1* | 5/2018 | Sun | G06F 16/285 |
| 2018/0130138 A1 | 5/2018 | Kumar | |
| 2018/0131660 A1 | 5/2018 | Lambert et al. | |
| 2018/0247344 A1* | 8/2018 | Feng | G06Q 30/0277 |
| 2019/0190875 A1* | 6/2019 | Dhariwal | G06N 20/00 |

* cited by examiner

| Interest Scores 460 | | | | |
|---|---|---|---|---|
| Contact 462 | Health 464 | Education 466 | Shopping 468 | Sports 470 |
| Friend1 | 0.6 | 1.0 | 0.8 | 0.3 |
| Friend2 | 0.4 | 0.8 | 0.5 | 1.0 |
| Friend3 | 0.5 | 0.6 | 0.2 | 0.8 |
| Friend4 | 0.7 | 0.5 | 0.6 | 0.6 |

DYNAMICALLY SELECTING A SCOPE OF FRIENDS FOR SHARING ON SOCIAL MEDIA BASED ON SHARING CRITERIA AND INTEREST

BACKGROUND

1. Technical Field

This disclosure generally relates to computer processing, and more specifically relates to a system and method for a user to dynamically and intelligently select a group of friends for sharing media content on social media.

2. Background Art

Social media platforms continue to grow in popularity and use. It is estimated that nearly a quarter of the world's population use Facebook, and WeChat has nearly one billion active users. Social media users share all kinds of media content and data with an ever increasing number of friends and contacts. With such tremendous growth in social media the amount of data sharing can be overwhelming to users.

BRIEF SUMMARY

A graphical user interface allows a user to dynamically select a scope of friends to share media content based on a sharing criteria and interest degree analysis. The sharing criteria may be selected by the user to filter friends for sharing content. The interest degree analysis may be provided from a social media platform that identifies the topic and content of the media which is being shared and determines a degree of interest for each friend on the identified topic. The degree of interest is used to assign each friend to a sharing scope on the graphical user interface to allow the user to select a scope of friends to share the media.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a system and method for allowing a user to dynamically select a scope of friends to share media content on social media based on a sharing criteria and interest degree analysis. The sharing criteria may be selected by the user to filter friends for sharing content. The interest degree analysis may be provided from a social media platform that identifies the topic and content of the media which is being shared and determines a degree of interest for each friend on the identified topic. The degree of interest is used to assign each friend to a sharing scope on the graphical user interface to allow the user to select a scope of friends to share the media.

Figure 1:
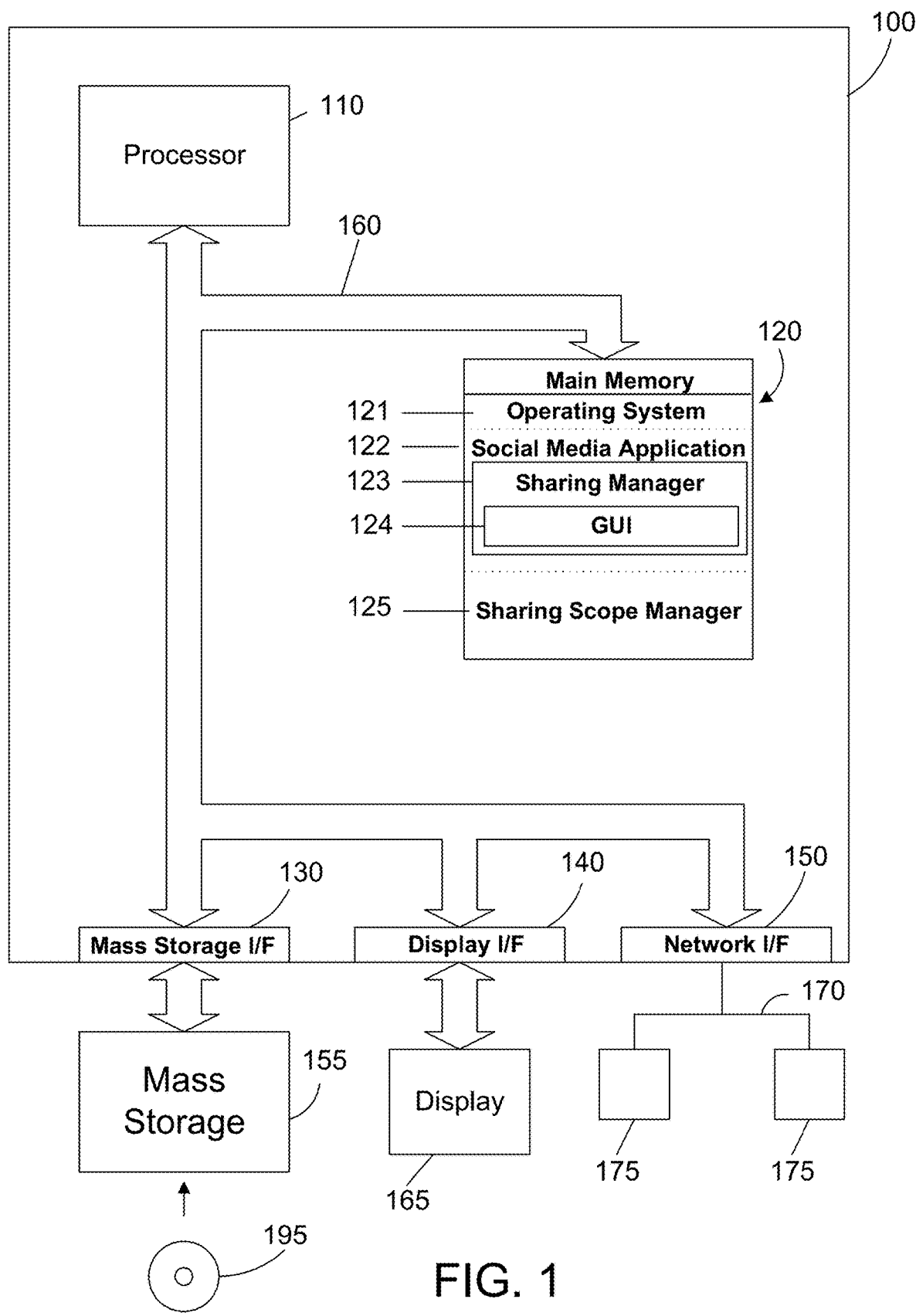
FIG. 1 is a block diagram a computer system that provides a user a graphical user interface to dynamically choose a scope of friends to share on social media based on sharing criteria and interest degree analysis.

Referring to FIG. 1, a computer system 100 is one suitable implementation of a computer system that is capable of performing the computer operations described herein including allowing a user to intelligently choose a scope of friends to share content on social media. Computer system 100 is a computer which can run multiple operating systems including the IBM i, Unix, Linux Android, or iOS operating systems. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes a social media application 122 with a sharing manager 123 and a graphical user interface (GUI) 124. The memory 120 also includes a sharing scope manager 125. The sharing scope manager 125 may be part of a social media platform as described further below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, social media application 122, sharing manager 123, graphical user interface 124, and sharing scope manager 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the social media application 122 and the sharing scope manager 125.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
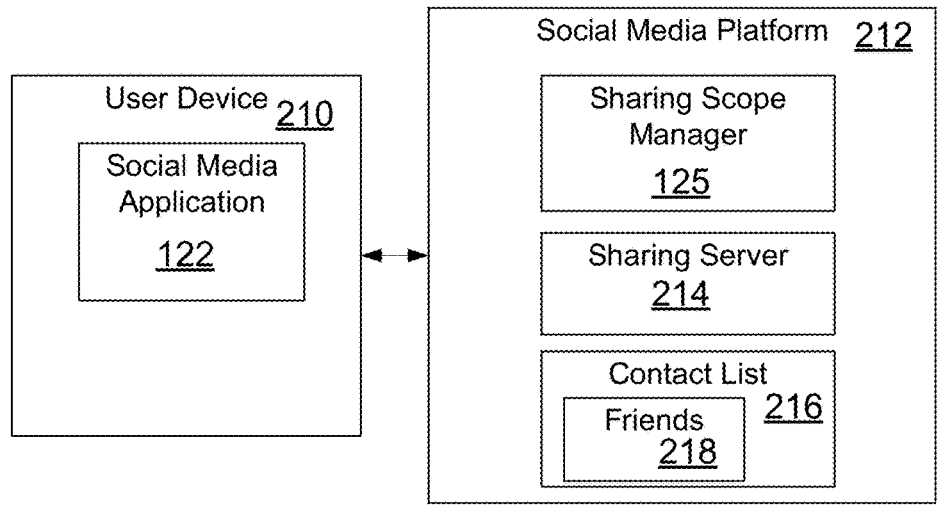
FIG. 2 illustrates a simplified block diagram of a user device connected to a social media platform with a sharing scope manager.

FIG. 2 illustrates a simplified block diagram of a user device 210 connected to a social media platform 212 with a sharing scope manager 125. The user device 210 executes a social media application 122 as described further below. The user device 210 may be any device capable of running a social media type application, including for example a phone, tablet, laptop or desktop personal computer. The social media platform 212 includes a sharing scope manager 125 introduced with reference to FIG. 1. The sharing scope manager includes modules described further below that work in conjunction with the sharing manager 123 in the social media application 122 to provide a graphical user interface 124 to a user which allows the user to intelligently choose a scope of friends to share social media based on a sharing criteria and interest degree analysis. The social media platform 212 further includes a sharing server 214 and a contact list 216. The sharing server 214 transfers the social media that the user wants to share with friends after the user selects a scope of friends with the graphical user interface as described below. The contact list 216 includes a list of friends 218 of the user. Each of the friends in the contact list 216 is analyzed to determine a sharing score for sharing the media content as described below. The contact list 216 and friends 218 may be maintained by the social media platform with user input from the social media application.

Figure 3:
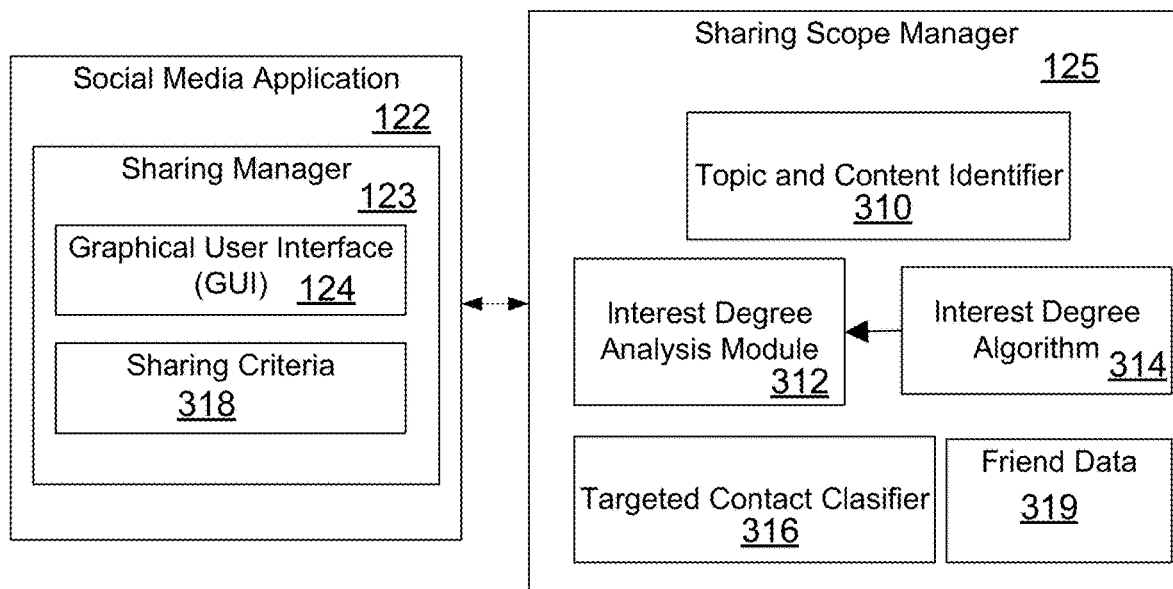
FIG. 3 illustrates further detail of the social media application and the sharing scope manager.

FIG. 3 illustrates further detail of the social media application 122 and the sharing scope manager 125 introduced above. The sharing scope manager 125 includes modules that work in conjunction with the sharing manager 123 to provide a graphical user interface to a user which allows the user to intelligently choose a scope of friends to share social media based on a sharing criteria and interest degree analysis. The sharing scope manager 125 includes a topic and content identifier 310, an interest degree analysis module 312 with an interest degree algorithm 314, a targeted contact classifier 316 and friend data 319. Each of these modules is described further below.

Again referring to FIG. 3, the social media application 122 includes the sharing manager 123. The sharing manager 123 works in conjunction with the sharing scope manager 125 to provide a graphical user interface to a user which allows the user to intelligently choose a scope of friends as described herein. The sharing manager 123 includes the graphical user interface 124 and sharing criteria 318. The graphical user interface is described further below with reference to FIGS. 4A and 4D. The user is allowed to select one or more of the sharing criteria 318. Selected sharing criteria is used by the targeted contact classifier 316 to identify and produce a filtered list of friends from the contact list using the friend data 319 as described further below with reference to FIG. 4B. Sharing criteria may include age, gender, occupation, location, health condition, interests, and other similar personal characteristics.

As introduced above, the sharing scope manager 125 includes a topic and content identifier 310. The topic and content identifier 310 identifies the topic and content proposed to be shared using context analysis technology. The reading material may include news, events, messages, activities, advertisement, or any other information posted on social media which the user would like to share with a group of friends. The topic and content identifier 310 may be working in the background as the user is looking at the various media. Alternatively, the topic and content identifier 310 may begin to identify the topic and content once the user selects to share the media. The topic and content identifier 310 is preferably located in the sharing scope manager 125 as part of the social media platform, but may also be located locally to the user in the social media application 122.

The sharing scope manager 125 further includes a targeted contact classifier 316. The targeted contact classifier 316 classifies and filters friends 218 on the contact list 216 according to the sharing criteria 318 to create a list of friends for sharing media content. Alternatively, the list of friends determined by the targeted contact classifier 316 can be used as an initial filter for friends in the contact list 216 that will be then be scored and displayed for selection by the user as described below with reference to FIG. 4D.

As introduced above, the sharing scope manager 125 includes an interest degree analysis module 312 with an interest degree algorithm 314. The interest degree analysis module 312 provides an interest degree score for each of the user's friends 218 in the user's contact list 216 based on the identified topic determined by the topic and content identifier 310 according to the interest degree algorithm 314. The interest degree algorithm 314 computes the interest degree score for each respective friend based on multiple factors such as the friends interests, the friend's history for similar topics, the friend's comments, the friend's feedback and output of any real-time user reaction analysis services on the different topics. The interest degree score can be represented by a numeric scaled score from 0 to 1, where 0 represents not interested and 1 represents very interested.

Figures 4A, 4B:
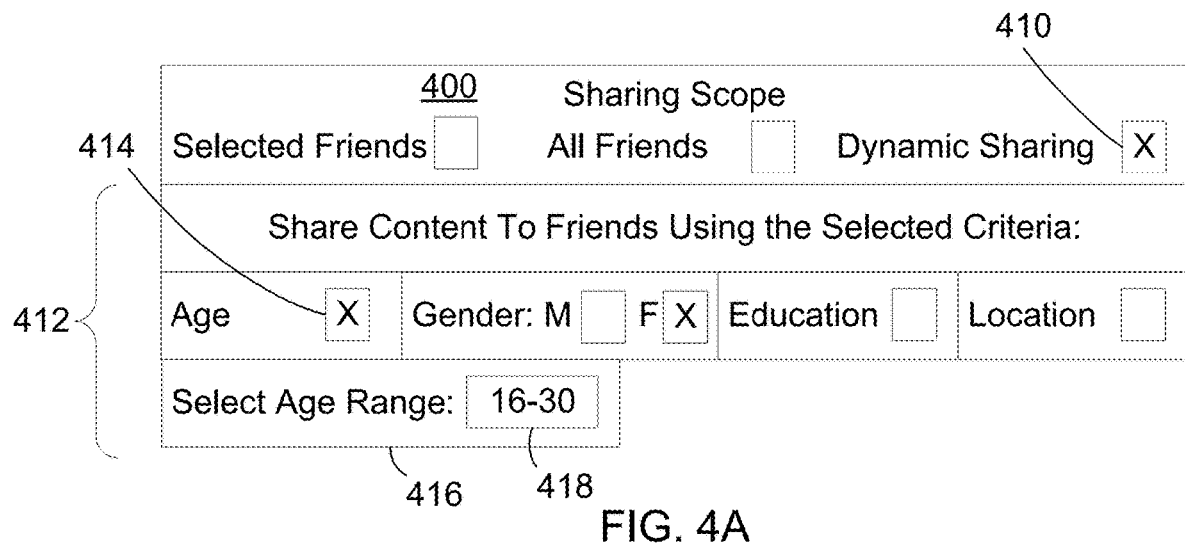
FIG. 4A illustrates an example of a user interface allowing a user to dynamically select sharing criteria for sharing media content to a number of friends.
FIG. 4B illustrates an example of friend data for friends of a user that is used by the sharing criteria to share media content.

FIG. 4A illustrates an example of a user interface for dynamically selecting sharing criteria for sharing media content to a number of friends. As introduced above, the user may select a scope of friends to share content on social media based on a sharing criteria and/or interest degree analysis. In this example, the user is given the opportunity to select dynamic sharing on a sharing scope interface 400 by clicking on a suitable icon such as the dynamic sharing box 410. When the user selects dynamic sharing, the user is then prompted with a sharing criteria menu 412 to select one or more sharing criteria. The sharing criteria may include age, gender, education, location, etc. For gender, the user may simply select a box for male or female as shown. When one or more of the sharing criteria is selected, a drop down box may prompt the user to provide a criteria data range or input. For example, if the user selects age criteria 414, a select age range box 416 may be displayed for the user to provide an age range 418. The sharing criteria is used to filter the user's friends for sharing social media using the friend data 319 in FIG. 4B as discussed below.

FIG. 4B illustrates an example of friend data 319. Friend data 319 represents data regarding friends of a user such as the friends 218 in the contact list 216 in FIG. 2. The friend data 319 is used in conjunction with the sharing criteria to determine a scope of friends to share media content. The sharing manager 123 in conjunction with the targeted contact classifier 316 apply the sharing criteria described above to the friend data 319 to filter the user's contact list 216 and determine a number of friends from the contact list to share media content. The friend data 319 may include a contact name 442, age 444, gender 446, occupation 448 and location 450. The friend data 319 may be stored on the user device 210 or the social media platform 212. The friend data 319 may be gathered by the targeted contact classifier 316 in FIG. 3 from data available to the sharing scope manager 125 about the user's friends 218 in the contact list 216 in FIG. 2. In the illustrated example, applying the selected sharing criteria from FIG. 4A of Gender=Female and Age=16-30 filters the friends in friend data 319 to yield a list of friends that include Friend1 and Friend2. The sharing manager may direct the sharing server to share the selected media content to the list of friends determined by the sharing criteria as described above. Alternatively, the filtered list of friends can be further filtered using interest degree analysis as described further below.

Figures 4C, 4D:
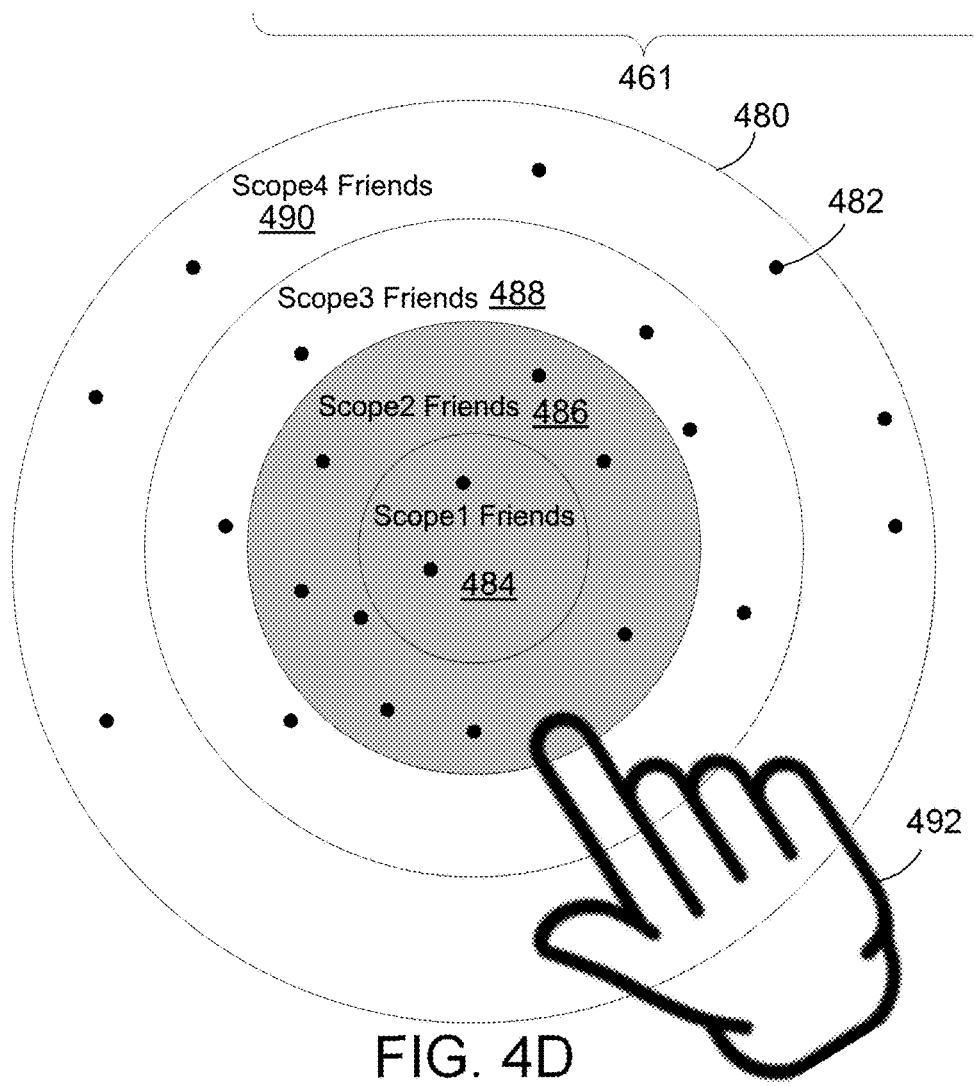
FIG. 4C illustrates a table of sharing score data for a number of friends.
FIG. 4D illustrates an example of a graphical user interface for a user to select a sharing scope of friends to share media content.

FIG. 4C illustrates a table 460 of interest scores 461 for a number of friends of a user. In this example, the interest scores 461 in the table 460 represent a score determined by the interest degree analysis module 312 using the interest degree algorithm 314 for each of the user's friends 218 in the contact list 216. The interest score table 460 includes a contact 462 that identifies a friend 218 in the contact list 216, and an interest score 461 for a number of topics. In this example, the topics include health 464, education 466, shopping 468 and sports 470. It should be recognized that FIG. 4A represents a very simplified example. In actual use, the number of friends may be hundreds or thousands, and there could be significantly more topics than shown in the example. The interest score 461 is passed to the sharing manager 123 to be displayed by the graphical user interface 124 as described further below.

FIG. 4D illustrates an example of a graphical user interface 480 for a user to select a sharing scope of friends to share media content on social media. The graphical user interface 480 displays graphical identifiers such as the dots 482 in FIG. 4 that represent friends with corresponding interest scores 461 of FIG. 4C. The interest scores 461 are determined for each friend for the topic extracted from the current media being shared by the user using the topic and content identifier as described above. A dot 482 or other graphic representing each friend is displayed on one of the concentric circles of the user interface 480 depending on the corresponding interest score. The distance from the center to each dot represents the interest score. The dots may be distributed evenly around the circle in a random manner so the user can easily see the number of dots within each concentric circle. Each of the concentric circles represents a range of interest scores. The graphical user interface places a dot 482 on the concentric circles for each of the friends according to the interest score in the table in FIG. 4A. In this example, there are four different scopes of friends, namely, scope1 484, scope2 486, scope 3 488 and scope4 490. The center scope, scope1 484, includes scores for friends with the highest interest in the topic. The interest scores are typically divided evenly for the different scopes. Thus scope1 484 includes friends with an interest score between 0.75 and 1, scope2 486 includes friends with an interest score between 0.5 and 0.75, scope3 488 includes friends with an interest score between 0.25 and 0.5 and scope4 490 includes friends with an interest score between 0 and 0.25.

Again referring to FIG. 4D, a user is able to select a sharing scope of friends to share media content using the graphical user interface 480. In this example, the user selects one or more concentric circles by touching 492 one of the concentric circles. The user interface will then select all the friends 482 in the selected concentric circle and all concentric circles towards the center from the selected concentric circle. Thus, in this example the user is selecting scope2 486 so the user interface will select scope2 486 and scope1 484. The selected scopes may be represented to the user by changing the color or tint of the concentric circles as shown.

Figure 5:
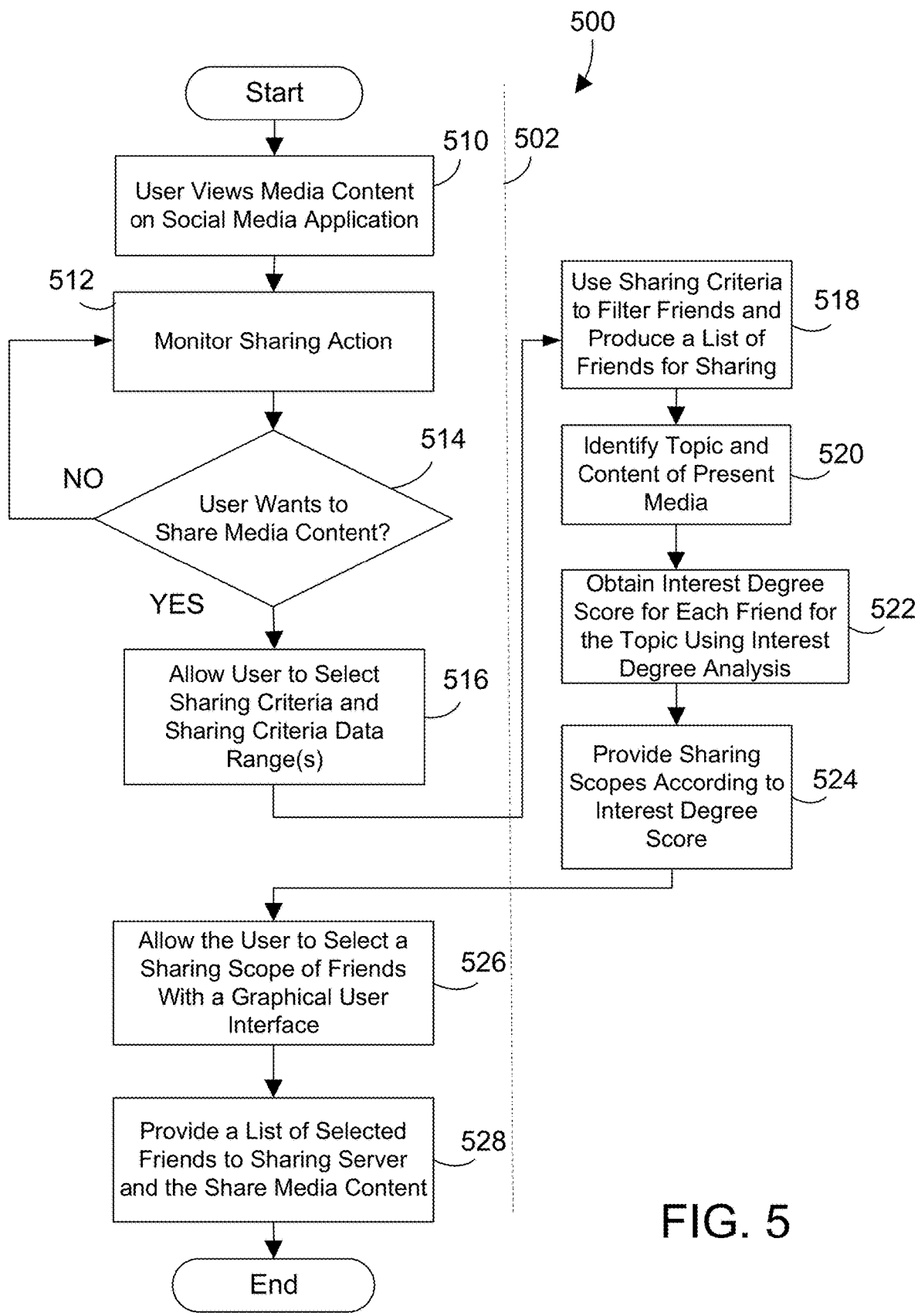
FIG. 5 is a flow diagram of a method for providing a graphical user interface to allow a user to intelligently choose a scope of friends to share media content based on interest degree analysis.

Referring to FIG. 5, a method 500 shows one suitable example for providing a user a graphical user interface to intelligently choose a scope of friends to share social media based on interest degree analysis. Portions of method 500 are preferably performed by the sharing manager 123 and the sharing scope manager 125 shown in FIG. 1. The portions of the method that are typically performed by the sharing manager 123 on the user device are shown to the left of the dotted line 502, and the portions of the method 500 that are typically performed by portions of the sharing scope manager 125 are shown to the right of dotted line 502. The user views media content on a social media application (step 510). Monitor sharing action by the user (step 512). Determine if the user wants to share media content (step 514). If the user does not want to share media content (step 514=no) then return to step 512. If the user does want to share media content shown by taking some action to share media content (step 514=yes) then allow the user to select sharing criteria and sharing criteria data range (step 516). Use the sharing criteria and sharing criteria data range to filter friends and produce a list of friends for sharing the media content (step 518). Identify a topic and content of the present media being viewed by the user (step 520). Obtain a degree of interest score for each friend for the topic using real-time interest degree analysis (step 522). Note: a degree of interest score can be determined for all friends in the contact list or just those in the filtered list of friends produced using the sharing criteria. Provide sharing scopes according to the degree of interest score (step 524). Allow the user to select a sharing scope of friends with a graphical user interface (step 526).

Provide a list of selected users to a sharing server and share the media content (step 528). Method 500 is then done.

Figure 6:
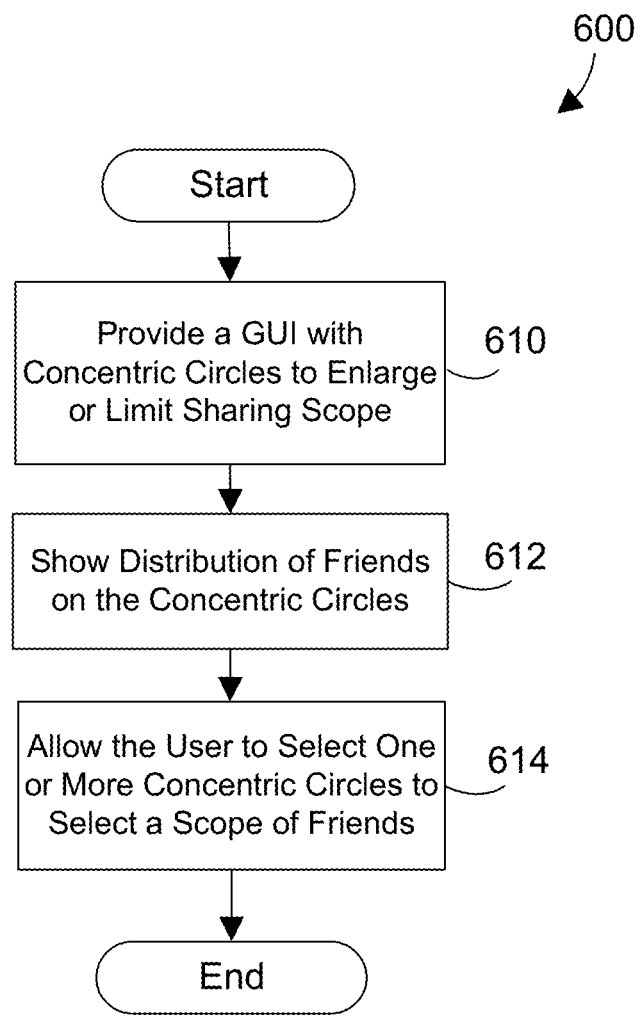
FIG. 6 is a flow diagram of a method for performing step 526 in FIG. 5.

FIG. 6 shows a suitable method 600 for allowing the user to select a sharing scope of friends with a graphical user interface. Method 600 thus shows one suitable method for performing step 526 in FIG. 5. Provide a graphical user interface with concentric circles for a user to select a sharing scope of friends (step 610). Show a distribution of the user's friends on the concentric circles (step 612). Allow the user to select one or more of the concentric circles to select a scope of friends (step 614). The method 600 is then done.

The claims and disclosure herein support an apparatus comprising: at least one processor; a memory coupled to the at least one processor; a social media application residing in the memory and executed by the at least one processor, the social media application having a sharing manager with a graphical user interface, wherein the graphical user interface allows a user to select dynamic sharing of media content to a number of friends from a contact list; in response to the user selecting dynamic sharing, the graphical user interface displays a plurality of criteria for filtering contacts, allows the user to select one or more of the displayed plurality of criteria and prompts the user to provide a data range for any selected of the one or more criteria; wherein the graphical user interface communicates with a targeted contact classifier that filters the contact list based on the selected one or more sharing criteria, the provided data range and friend data to produce a list of friends; and wherein the graphical user interface communicates with a sharing server to share the media content to the list of friends.

The claims and disclosure herein further support a computer-implemented method executed by at least one processor for dynamically sharing on social media comprising: monitoring sharing action of a user viewing media content on a social media application to determine when a user wants to share media content; when the user acts to share media content, giving the user an option to dynamically share the media content to a number of friends from a contact list; in response to the user selecting dynamic sharing, displaying a plurality of criteria for filtering contacts, allowing the user to select one or more of the displayed plurality of criteria and prompting the user to provide a data range for any selected of the one or more criteria; producing a list of friends by filtering the contact list based on the selected one or more sharing criteria, the provided data range and friend data; identifying a topic of the media content being viewed by the user; determining an interest degree score for friends in the list of friends for the identified topic; providing sharing scopes of friends to the user according to the interest degree score to the user; allowing the user to select a sharing scope of friends with a graphical user interface; and providing a list of selected friends from the sharing scope of friends to a sharing sever to share the media content.

The claims and disclosure herein additionally support a computer-implemented method executed by at least one processor for dynamically sharing on social media comprising: monitoring sharing action of a user viewing media content on a social media application to determine when a user wants to share media content; when the user acts to share media content, giving the user an option to dynamically share the media content to a number of friends from a contact list; in response to the user selecting dynamic sharing, identifying a topic of the media content being viewed by the user; determining an interest degree score for friends in the contact list for the identified topic; and providing sharing scopes of friends to the user according to the interest degree score to the user; allowing the user to select a sharing scope of friends with a graphical user interface; and providing a list of selected friends from the sharing scope of friends to a sharing sever to share the media content.

A graphical user interface allows a user to intelligently and dynamically select a scope of friends to share social media based on a sharing criteria and interest degree analysis to target and limit shared social media. The sharing criteria may be selected by the user to filter friends for sharing content. The interest degree analysis identifies the topic and content of the media which is being shared and determines a degree of interest for each friend on the identified topic. The degree of interest is used to assign each friend to a sharing scope of the graphical interface to allow the user to select a scope of friends to share the media.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a social media application residing in the memory and executed by the at least one processor, the social media application having a sharing manager with a graphical user interface,
   wherein the graphical user interface allows a user to select dynamic sharing of media content to a number of friends from a contact list;
   in response to the user selecting dynamic sharing, the graphical user interface displays a plurality of criteria for filtering contacts, and allows the user to select one of the displayed plurality of criteria;
   in response to the user selecting one of the displayed plurality of criteria for filtering contacts, prompts the user to provide a data range for the selected criteria;
   wherein the graphical user interface communicates with a targeted contact classifier that filters the contact list based on the data range provided by the user for the selected criteria and friend data to produce a list of friends;
   wherein the graphical user interface allows the user to select the sharing scope by:
   displaying a distribution of friends with a plurality of concentric circles where each concentric circle represents a scope of interest scores and each concentric circle is populated with identifiers, where each identifier corresponds to a friend with a score in the corresponding scope of interest scores, and
   allowing the user to select a scope of friends to share media content by selecting one of the concentric circles; and
   wherein the graphical user interface communicates with a sharing server to share the media content to the list of friends.

2. The apparatus of claim 1, further comprising:
   a social media platform with a topic and content identifier that identifies a topic of media being viewed by the user and an interest degree analysis module that determines a score for friends in the contact list for the identified topic.

3. The apparatus of claim 2, wherein the graphical user interface allows the user to select a sharing scope of friends based on the score.

4. The apparatus of claim 3, wherein the interest degree analysis module determines the score for friends in the list of friends from the targeted contact classifier for the identified topic.

5. The apparatus of claim 1, wherein the sharing criteria comprises age, gender, education and location.

6. The apparatus of claim 1, wherein targeted contact classifier and the sharing server are located within a social media platform.

7. The apparatus of claim 2, wherein the interest degree analysis module determines the score for the identified topic determined by the topic and content identifier based on factors for the respective friend including: interests, history for similar topics, comments, and feedback.

8. A computer-implemented method executed by at least one processor for dynamically sharing on social media comprising:
    monitoring sharing action of a user viewing media content on a social media application to determine when a user wants to share media content;
    when the user acts to share media content, giving the user an option to dynamically share the media content to a number of friends from a contact list;
    in response to the user selecting dynamic sharing, displaying a plurality of criteria for filtering contacts and allowing the user to select one of the displayed plurality of criteria;
    in response to the user selecting one of the displayed plurality of criteria for filtering contacts, prompting the user to provide a data range for the selected criteria;
    producing a list of friends by filtering the contact list based on the data range provided by the user for the selected criteria and friend data;
    identifying a topic of the media content being viewed by the user;
    determining an interest degree score for friends in the list of friends for the identified topic;
    providing sharing scopes of friends to the user according to the interest degree score to the user;
    allowing the user to select a sharing scope of friends with a graphical user interface by:
    displaying a distribution of friends with a plurality of concentric circles where each concentric circle represents a scope of interest scores and each concentric circle is populated with identifiers, where each identifier corresponds to a friend with a score in the corresponding scope of interest scores, and
    allowing the user to select a scope of friends to share media content by selecting one of the concentric circles; and
    providing a list of selected friends from the sharing scope of friends to a sharing sever to share the media content.

9. The method of claim 8, wherein the sharing criteria comprises age, gender, education and location.

10. The method of claim 8, wherein the interest degree score for friends is determined for the identified topic determined by the topic and content identifier based on factors for the respective friend including: interests, history for similar topics, comments, and feedback.

11. A computer-implemented method executed by at least one processor for dynamically sharing on social media comprising:
    monitoring sharing action of a user viewing media content on a social media application to determine when a user wants to share media content;
    when the user acts to share media content, giving the user an option to dynamically share the media content to a number of friends from a contact list;
    in response to the user selecting dynamic sharing, identifying a topic of the media content being viewed by the user;
    determining an interest degree score for friends in the contact list for the identified topic; and
    providing sharing scopes of friends to the user according to the interest degree score to the user;
    allowing the user to select a sharing scope of friends with a graphical user interface by:
    displaying a distribution of friends with a plurality of concentric circles where each concentric circle represents a scope of interest scores and each concentric circle is populated with identifiers, where each identifier corresponds to a friend with a score in the corresponding scope of interest scores; and
    allowing the user to select a scope of friends to share media content by selecting one of the concentric circles; and
    providing a list of selected friends from the sharing scope of friends to a sharing sever to share the media content.

12. The method of claim 11, wherein the sharing criteria comprises age, gender, education and location.

13. The method of claim 11, wherein the interest degree score for friends is determined for the identified topic determined by the topic and content identifier based on factors for the respective friend including: interests, history for similar topics, comments, and feedback.

* * * * *